(12) United States Patent
Hui et al.

(10) Patent No.: US 8,294,418 B2
(45) Date of Patent: Oct. 23, 2012

(54) POWER TRANSFER DEVICE AND METHOD

(75) Inventors: Shu Yuen Ron Hui, Shatin (HK); Quan Xue, Honk Kong (HK); Kwun Chiu Wan, Kowloon (HK)

(73) Assignee: ConvenientPower, Ltd., Hong Kong (CN)

( * ) Notice: Subject to any disclaimer, the term of this patent is extended or adjusted under 35 U.S.C. 154(b) by 287 days.

(21) Appl. No.: 12/699,563

(22) Filed: Feb. 3, 2010

(65) Prior Publication Data
US 2011/0187318 A1 Aug. 4, 2011

(51) Int. Cl.
*H02J 7/00* (2006.01)
*H01F 27/42* (2006.01)
*H05K 7/14* (2006.01)

(52) U.S. Cl. .......................... 320/108; 307/104; 307/149

(58) Field of Classification Search ................... 320/108; 307/104, 149
See application file for complete search history.

(56) References Cited

U.S. PATENT DOCUMENTS

| | | | |
|---|---|---|---|
| 4,696,055 A | 9/1987 | Marshall | |
| 5,487,179 A | 1/1996 | Larsson | |
| 5,668,561 A | 9/1997 | Perrotta et al. | |
| 6,127,799 A | 10/2000 | Krishnan | |
| 6,191,670 B1 | 2/2001 | Nguyen | |
| 6,542,724 B1 | 4/2003 | Copeland et al. | |
| 6,577,850 B2 | 6/2003 | Norimatsu | |
| 6,937,200 B2 | 8/2005 | Takei | |
| 7,088,964 B2 | 8/2006 | O | |
| 7,162,684 B2 * | 1/2007 | Hocevar | 714/800 |
| 7,239,145 B2 | 7/2007 | Homan et al. | |
| 7,576,514 B2 | 8/2009 | Hui | |
| 2007/0021140 A1 | 1/2007 | Keyes et al. | |
| 2007/0222426 A1 | 9/2007 | Waffenschmidt et al. | |
| 2007/0287508 A1 | 12/2007 | Telefus | |
| 2008/0165066 A1 | 7/2008 | Tiscareno | |
| 2009/0111393 A1 | 4/2009 | Scalisi et al. | |
| 2009/0121675 A1 | 5/2009 | Ho et al. | |
| 2009/0236140 A1 | 9/2009 | Randall | |
| 2009/0278494 A1 | 11/2009 | Randall | |
| 2010/0034238 A1 * | 2/2010 | Bennett | 375/130 |
| 2010/0110741 A1 | 5/2010 | Lin et al. | |
| 2010/0174629 A1 | 7/2010 | Taylor et al. | |
| 2010/0201313 A1 * | 8/2010 | Vorenkamp et al. | 320/108 |
| 2010/0202627 A1 | 8/2010 | Gray | |
| 2010/0253442 A1 | 10/2010 | Mu | |

(Continued)

FOREIGN PATENT DOCUMENTS

CN 101478256 A 7/2009

(Continued)

OTHER PUBLICATIONS

Hui, S. Y, et al., "A comparison of nondeterministic and deterministic switching methods for DC-DC power converters", *IEEE Transactions on Power Electronics*, 13(6), (Nov. 1998), 1046-1055.

(Continued)

*Primary Examiner* — M'Baye Diao
(74) *Attorney, Agent, or Firm* — Fenwick & West LLP

(57) ABSTRACT

The present invention provides a power transfer device for charging a wireless communication device having a communication bandwidth, and an associated method of transferring power. The device and method of the invention use a spread-spectrum technique to reduce or minimize interference signals within the communication bandwidth and within the power transfer device.

36 Claims, 6 Drawing Sheets

U.S. PATENT DOCUMENTS

| | | | |
|---|---|---|---|
| 2010/0276995 A1* | 11/2010 | Marzetta et al. | 307/11 |
| 2011/0070830 A1 | 3/2011 | Xue et al. | |
| 2011/0199045 A1 | 8/2011 | Hui et al. | |

FOREIGN PATENT DOCUMENTS

| | | |
|---|---|---|
| CN | 101496267 A | 7/2009 |
| CN | 101540554 A | 9/2009 |
| EP | 2151906 A2 | 2/2010 |
| WO | WO-2009033043 A2 | 3/2009 |

OTHER PUBLICATIONS

"U.S. Appl. No, 12/566,438, Non Final Office Action mailed Feb. 17, 2012", 28 pgs.

"U.S. Appl. No. 12/705,911, Non Final Office Action mailed Apr. 23, 2012", 11 pgs.

Chung, H. et al., "Use of Chaotic Switching for Harmonic Power Redistribution in Power Converters," Chaos in Circuits and Systems, World Scientific Publishing Co. Pte. Ltd., 2002, Chapter 17, pp. 341-365.

European Extended Search Report, European Application No. 10251641.6, Feb. 28, 2011, 6 pages.

European Examination Report, European Application No. 10251641.6, Nov. 4, 2011, 5 pages.

PCT International Search Report, PCT Application No. PCT/IB2010/002395, Jan. 20, 2011, 5 pages.

PCT Written Opinion, PCT Application No. PCT/IB2010/002395, Jan. 20, 2011, 4 pages.

* cited by examiner

POWER TRANSFER DEVICE AND METHOD

FIELD OF THE INVENTION

The present invention relates to power transfer devices, and in particular but not limited to, power transfer devices for charging wireless communication devices. The invention will be described in the context of power transfer devices that wirelessly charge portable wireless communication devices. However, it will be appreciated that the invention is not limited to this particular use.

BACKGROUND OF THE INVENTION

Spread-spectrum techniques have been proposed for reducing the input switching harmonics in power supplies in order to meet the IEC electromagnetic compatibility (EMC) requirements.

The constant-switching actions of power converters generate harmonics at fixed frequencies as shown in FIG. 1. IEC regulations impose limits on the current harmonic components on the input side. The harmonics generated by the constant-switching power converter cause "conducted" electromagnetic interference (EMI) because the current harmonics can adversely affect all other instruments using the same power supply through the "conducting" cables.

In particular, if the power converter switches at a constant frequency A, the input current harmonic power spectrum typically consists of discrete harmonic components B, as shown in FIG. 1. The existence of these discrete harmonics means that the power of the harmonics (which can be considered as noise) concentrates at a few discrete frequencies in the spectrum. Since the power concentrates at a few discrete frequencies, the magnitude of the harmonic power is considerable. Therefore, spread-spectrum techniques have been proposed to reduce the magnitude of the input current harmonic power for switching power converters.

FIG. 2 shows a schematic diagram of a spread-spectrum power converter and the typical input current harmonic spectrum exhibited by the converter. Spread-spectrum techniques vary the switching actions in different ways so as to vary at least one switching parameter (such as switching frequency, pulse position, etc) in order to generate the harmonics in slightly different ways. Thus, the switching harmonics do not remain at fixed frequencies all the time. Consequently, the average harmonic power can be spread over a wide range of the spectrum with a significantly reduced magnitude, as shown in FIG. 2.

In the prior spread-spectrum techniques described above, the purpose is to reduce the conducted EMI generated by power converters so that the quality of the power system is not deteriorated.

SUMMARY OF THE INVENTION

The present invention provides, in a first aspect, a power transfer device for charging a wireless communication device having a communication bandwidth, the power transfer device transferring power at a transfer frequency using a spread-spectrum technique to reduce or minimize interference signals within the communication bandwidth.

In a second aspect, the present invention provides a power transfer device for charging a wireless communication device having a communication bandwidth, the power transfer device transferring power at a transfer frequency, wherein either: the transfer frequency is selected to be greater than or equal to the magnitude of the communication bandwidth; or the transfer frequency is selected to be less than the magnitude of the communication bandwidth and the power transfer device transfers power using a spread-spectrum technique to reduce or minimize interference signals within the communication bandwidth.

Preferably, the power transfer device wirelessly charges the wireless communication device. More preferably, the power transfer device wirelessly charges the wireless communication device using induction.

Preferably, the spread-spectrum technique reduces or minimizes interference within the power transfer device.

In a third aspect, the present invention provides a method of transferring power to a wireless communication device having a communication bandwidth, the method including using a spread-spectrum technique to transfer power at a transfer frequency to reduce or minimize interference signals within the communication bandwidth.

In a fourth aspect, the present invention provides a method of transferring power to a wireless communication device having a communication bandwidth, the method including selecting to either: transfer power at a transfer frequency greater than or equal to the magnitude of the communication bandwidth; or use a spread-spectrum technique to transfer power at a transfer frequency less than the communication bandwidth to reduce or minimize interference signals within the communication bandwidth.

Preferably, power is transferred to wirelessly charge the wireless communication device. More preferably, power is transferred using induction to wirelessly charge the wireless communication device.

Preferably, a power transfer device is used to transfer power and the spread-spectrum technique is used to reduce or minimize interference within the power transfer device.

The following preferred features and embodiments apply to all of the aspects of the invention described above.

Preferably, the spread-spectrum technique reduces or minimizes the concentration of the interference signals. Also preferably, the spread-spectrum technique reduces or minimizes the magnitude of at least one of the interference signals. The spread-spectrum technique preferably reduces or minimizes the average power of the interference signals.

Preferably, power is transferred by switching and the spread-spectrum technique varies at least one of the characteristics of the switching. Also preferably, the spread-spectrum technique varies at least one of switching frequency, switching pulse width, and switching pulse position.

Preferably, the spread-spectrum technique is at least one of dithering, pseudo-random, random, chaotic, and modulated type, and thereby varies the transfer frequency.

Preferably, the spread-spectrum technique varies the transfer frequency within a transfer bandwidth that maximizes the energy efficiency of the power transfer.

In some embodiments, the spread-spectrum technique utilizes at least one of variable pulse-position modulation, variable pulse-width modulation, variable carrier-frequency modulation with fixed duty cycle, and variable carrier-frequency modulation with variable duty cycle. In other embodiments, the spread-spectrum technique utilizes a frequency hopping spread-spectrum method. In further embodiments, the spread-spectrum technique utilizes a direct sequence spread-spectrum method. In other embodiments, the spread-spectrum technique utilizes a randomized frequency method.

Preferably, the direct sequence spread-spectrum method is implemented with a microprocessor control unit and a voltage controlled oscillator. Preferably, the microprocessor control unit has a clock frequency and generates switching control signals for a power inverter in the power transfer device, the direct sequence spread-spectrum method including storing a pseudo-random sequence in the microprocessor control unit and sending out the pseudo-random sequence to modulate the clock frequency through the voltage controlled oscillator. Also preferably, the microprocessor control unit has an internal reference clock signal or an external reference clock signal. Preferably, the voltage controlled oscillator is implemented with two varactors.

Preferably, the communication bandwidth is located between 800 MHz and 1900 MHz.

Preferably, the transfer frequency is less than the magnitude of the communication bandwidth.

BRIEF DESCRIPTION OF THE FIGURES

Preferred embodiments in accordance with the best mode of the present invention will now be described, by way of example only, with reference to the accompanying figures, in which.

DETAILED DESCRIPTION OF THE BEST MODE OF THE INVENTION

Figure 1:
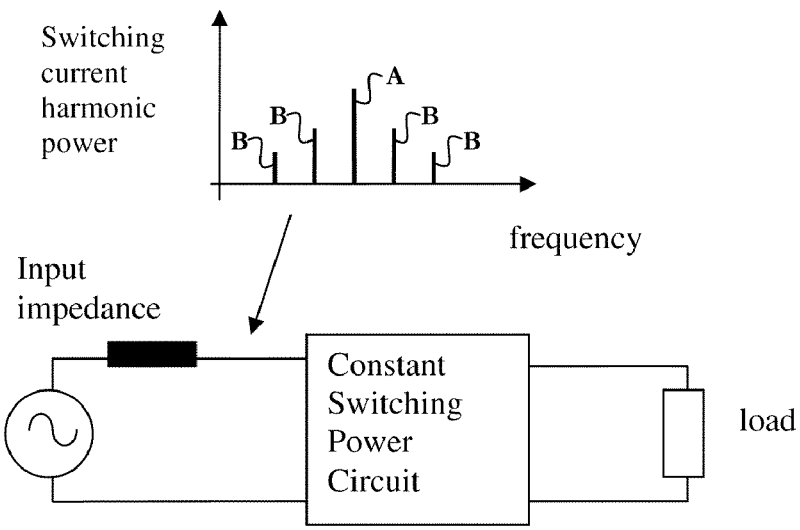
FIG. 1 is a schematic diagram of a prior art constant-switching power converter circuit and a graph of a typical input current harmonic spectrum of said circuit.
Figure 2:
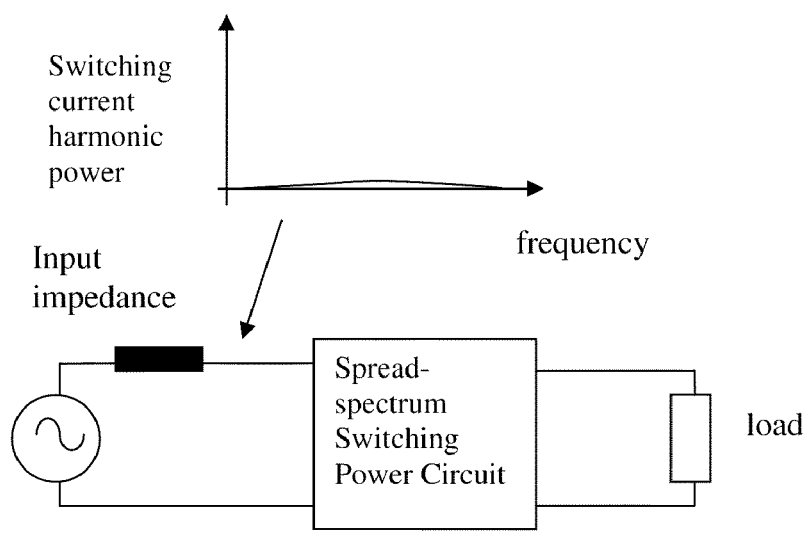
FIG. 2 is a schematic diagram of a prior art spread-spectrum power converter circuit and a graph of a typical input current harmonic spectrum of said circuit.

Referring to the figures, there is provided a power transfer device 1 for charging a wireless communication device 2 having a communication bandwidth 3. The power transfer device 1 transfers power at a transfer frequency 4 using a spread-spectrum technique to reduce or minimize interference signals 5 within the communication bandwidth 3.

The spread-spectrum technique reduces or minimizes at least one of: the concentration of the interference signals; the magnitude of at least one of the interference signals; and the average power of the interference signals. In the present embodiment, the spread-spectrum technique minimizes all three of these aspects, and in particular, the concentration, the magnitude, and the average power of all of the interference signals 5.

The spread-spectrum technique also reduces or minimizes interference within the power transfer device 1.

The spread-spectrum technique varies the transfer frequency 4 within a transfer bandwidth 6 that maximizes the energy efficiency of the power transfer of the power transfer device 1. Further, the spread-spectrum technique can be at least one of dithering, pseudo-random, random, chaotic, and modulated type, and thereby varies the transfer frequency 4.

Spread-spectrum techniques spread harmonic energy across a spectrum. The spreading of harmonic energy across the spectrum may be carried out in various ways. Randomization schemes and their syntheses have been addressed in various papers, including 'A comparison of nondeterministic and deterministic switching methods for DC-DC power converters', IEEE Transactions on Power Electronics, Volume: 13 Issue: 6, Nov. 1998, Page(s): 1046-1055, authored by Hui, S.Y., Shrivastava, Y., Sathiakumar, S., Tse, K. K., and Chung H.

Particular embodiments of the spread-spectrum technique of the present invention utilize at least one of variable pulse-position modulation, variable pulse-width modulation, variable carrier-frequency modulation with fixed duty cycle, and variable carrier-frequency modulation with variable duty cycle. These modulation schemes are described as variable, which includes random, chaotic, and pseudo-random. For example, the modulation schemes include random pulse-position modulation (RPPM), random pulsewidth modulation (RPWM), and random carrier-frequency modulation with fixed duty cycle (RCFMFD), and with variable duty cycle (RCFMVD), respectively.

Other embodiments utilize a frequency hopping spread-spectrum method. Further embodiments of the spread-spectrum technique utilize a direct sequence spread-spectrum method and a randomized frequency modulation method.

In one embodiment, a direct sequence spread-spectrum method is implemented with a microprocessor control unit 7 and a voltage controlled oscillator 8. The microprocessor control unit 7 has a clock frequency and generates switching control signals for a power inverter in the power transfer device 1. The direct sequence spread-spectrum method includes storing a pseudo-random sequence in the microprocessor control unit 7 and sending out the pseudo-random sequence to modulate the clock frequency through the voltage controlled oscillator 8. The microprocessor control unit 7 has an internal reference clock signal or an external reference clock signal. These reference clock signals provide the clock frequency. The reference clock signals can be provided, for example, by a clock crystal oscillator. The voltage controlled oscillator 8 is implemented with two varactors 9.

The power transfer device 1 of the present embodiment transfers power by switching. Generally speaking, where switching is involved, the spread-spectrum technique can vary at least one of the characteristics of the switching. This includes varying at least one of switching frequency, switching pulse width, and switching pulse position, and can utilize the various embodiments of spread-spectrum techniques described above.

Embodiments of the present invention are well-suited to reducing or minimizing signal jamming in wireless communication devices, such as mobile phones, whilst the wireless communication devices are being wirelessly charged by wireless battery charging systems, these being a particular type of the power transfer device 1. One particular example of such a wireless battery charging system is a wireless charging pad, which wirelessly charges the wireless communication devices using induction. The spread-spectrum techniques provided by embodiments of the present invention, allow the wireless charging pad to provide charging power and simultaneously spread not only the fundamental radiating power, but also its harmonics, over a wide spectrum. In doing so, the average switching power picked up in the radio-frequency circuits and antennas of the wireless communication devices becomes insignificant, and thus, will not cause any noticeable degradation in the quality of the transmitted and received signals in the wireless communication devices.

Figure 3:
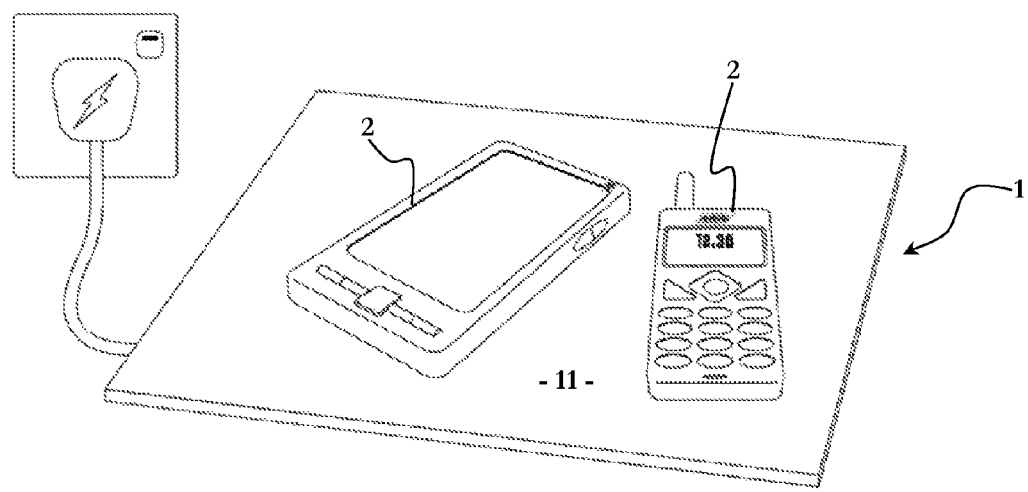
FIG. 3 is a perspective diagrammatic view of a power transfer device in accordance with an embodiment of the present invention, the power transfer device being in the form of a wireless charging pad and shown wirelessly charging multiple wireless communication devices.
Figure 4:
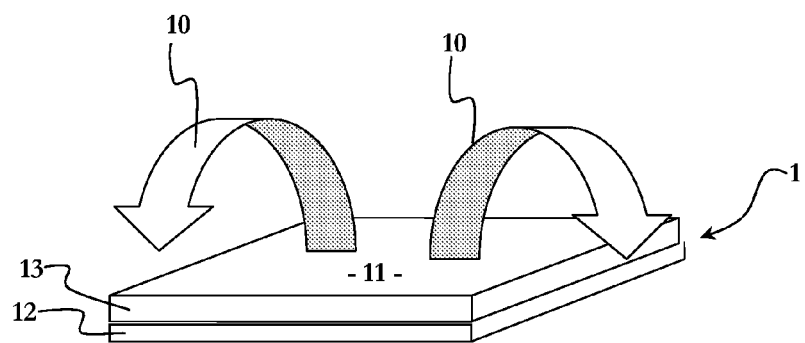
FIG. 4 is a perspective diagrammatic view of the wireless battery charging pad of FIG. 3 shown generating lines of vertical magnetic flux.

In the embodiment of the present invention shown in FIGS. 3 and 4, the power transfer device 1 is in the form of such a wireless charging pad. The wireless charging pad 1 transfers power to charge the wireless communication devices 2, which can be mobile phones and other mobile devices. In particular, vertical electromagnetic flux 10 is generated from a charging surface 11 of the wireless charging pad 1 at the transfer frequency 4, as shown in FIG. 4. The transfer frequency 4 can be any appropriate frequency for efficient energy transfer. In the present embodiment, for example, the transfer frequency 4 is 110 kHz. An energy-receiving module inside the wireless communication devices 2 will pick up this flux and turn it into a DC voltage for charging the battery of the wireless communication devices. In this particular embodiment, the wireless charging pad 1 also includes an electromagnetic shield 12 under a charging platform 13 on top of which is the charging surface 11.

One issue encountered by these wireless battery charging systems is the interference between the system (which in the presently described embodiment, is the wireless charging pad 1) and the wireless communication devices 2. Despite the fact that these wireless charging systems typically operate at relatively low frequencies (for example, at 110 kHz) and the signals of the wireless communication devices 2 (which can be, for example, mobile phones) are of 800 to 1900 MHz typically, these two widely different operating frequencies will in fact interfere with each other.

Assuming one of the wireless communication devices 2 is a mobile phone 14, the interference mechanism can be described as follows: the mobile phone circuits pick up the wireless charging signal at the transfer frequency 4 (110 kHz), then this signal and the mobile phone signal (800 to 1900 MHz) will be fed together into the non-linear devices, such as an amplifier, mixer, demodulator, etc., leading to intermodulation products (900 MHz±110 kHz, for example). These intermodulation products fall into the operating band of the mobile phone 14, deteriorating the signal to noise ratio of the mobile phone and reducing its sensitivity.

As well as affecting the wireless communication devices 2, interference, such as the type described above, also affects the power transfer device 1. As mentioned previously, the spread-spectrum techniques provided by embodiments of the present invention also reduce or minimize interference, such as the type described above, within the power transfer device 1 itself. For example, if the power transfer device 1 is in the form of one of the wireless battery charging systems previously described and has a transmitter (TX) circuit, the spread-spectrum techniques of the present invention reduce or minimize any interference generated, through mechanisms such as those described above, within the TX circuit. In particular, it has been found that interference is generated when strong RF signals are injected into circuits of the wireless battery charging system. Specifically, higher frequency interference can be generated in the PN junction inside the circuits. The spread-spectrum techniques in embodiments of the present invention can reduce or minimize this type of interference.

Figure 5:
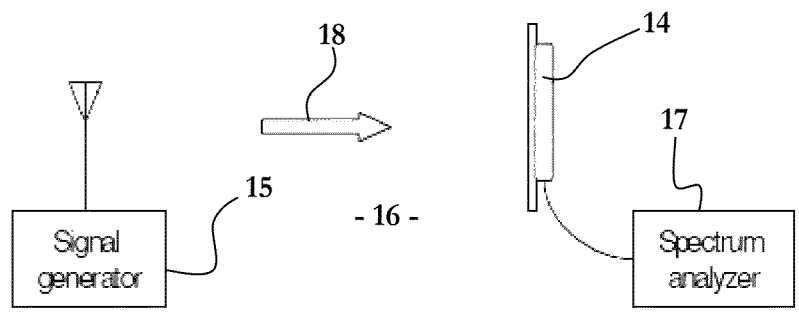
FIG. 5 is a schematic diagram showing an experimental setup used to measure interference from a wireless charging pad wirelessly charging a wireless communication device in the form of a mobile phone.

FIG. 5 shows an experimental setup in which a RF signal generator 15 is used to transmit a signal to the mobile phone 14 inside a radio-frequency anechoic chamber 16. The mobile phone 14 is mounted on the wireless charging pad 1 to receive charging power from the wireless charging pad. A spectrum analyzer 17 is connected to analyze the spectrum of signals received by the mobile phone 14.

Using the experimental setup, the inventors have discovered that a high-frequency signal (say, at fc=900 MHz) received by the mobile phone 14 can be interfered by the charging flux 10 generated by the wireless charging pad 1 at the transfer frequency 4 (say, at fs=110 kHz). As a result of modulation, the high-frequency signal received by the mobile phone 14 behaves like a carrier signal and the low-frequency charging flux 10 behaves like a modulated signal.

Figure 6:
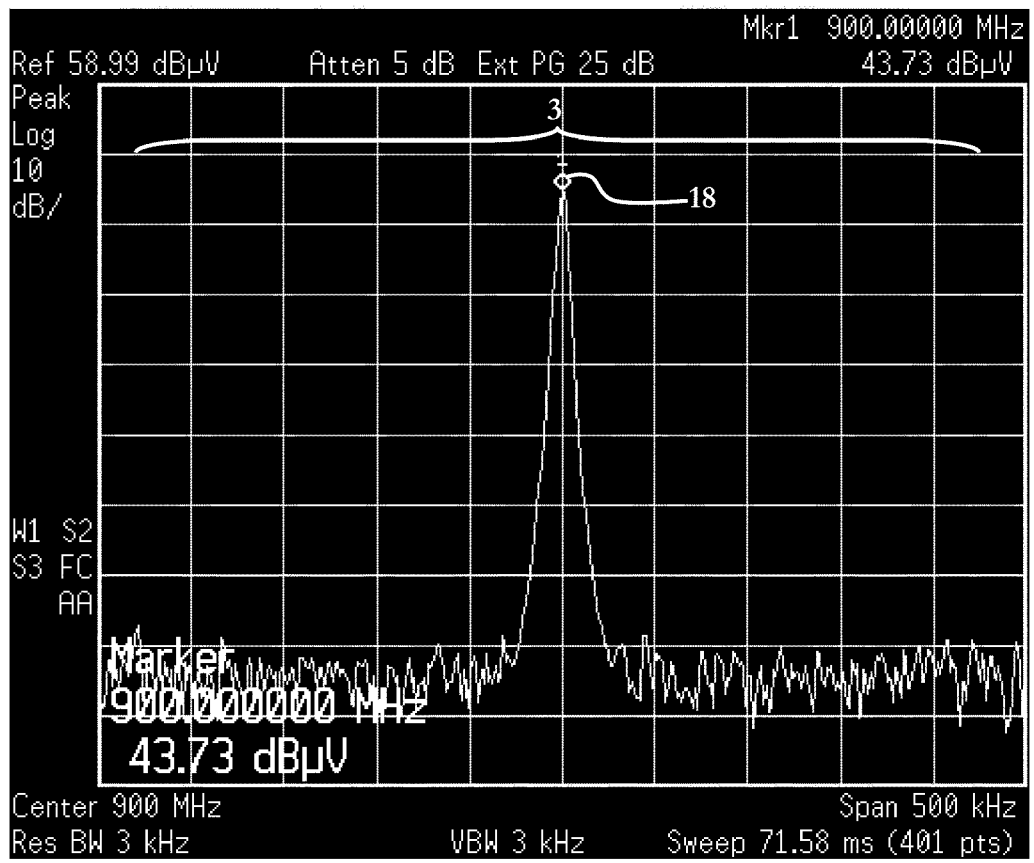
FIG. 6 is a graph of the signals received by the mobile phone in the experimental setup shown in FIG. 5 when a 900 MHz signal was transmitted to the mobile phone and the mobile phone was not being charged by the wireless charging pad.
Figure 7:
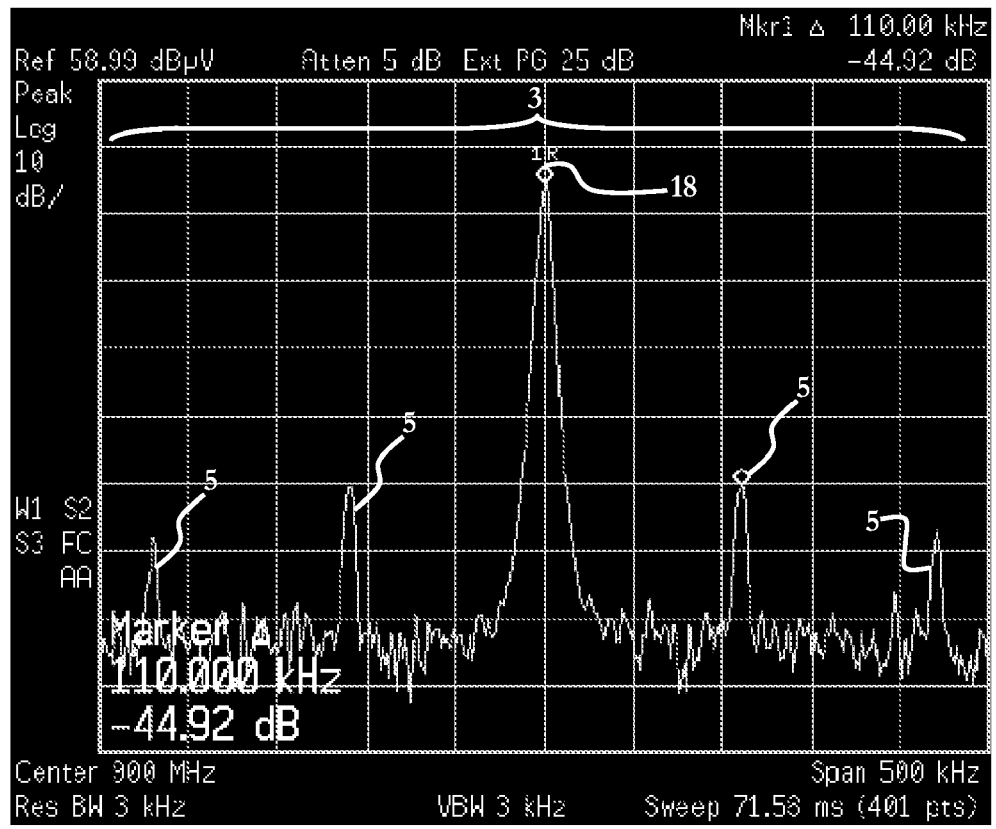
FIG. 7 is a graph of the signals received by the mobile phone in the experimental setup shown in FIG. 5 when a 900 MHz signal was transmitted to the mobile phone and the mobile phone was being charged by the wireless charging pad with AC flux at 110 kHz.

During an experiment, the signal generator 15 radiated a 900 MHz signal 18 and the signal received by the antenna of the mobile phone 14 was measured. FIG. 6 shows the measured spectrum of the signal received by the antenna of the mobile phone 14 while there was no low-frequency charging flux 10. The 900 MHz signal 18 was clearly observed. Then the wireless charging pad 1 was activated to charge the mobile phone 14 at the transfer frequency 4, which was at 110 kHz. FIG. 7 shows the measured spectrum of the antenna signal of the mobile phone 14 when it was being charged. Besides the 900 MHz carrier signal 18, interference signals 5, in the form of sidebands, arising from the 110 kHz charging transfer frequency 4 were present. That is to say, harmonics at frequencies of (fc−2fs), (fc−fs), (fc+fs) and (fc+2fs), were present.

Figure 8:
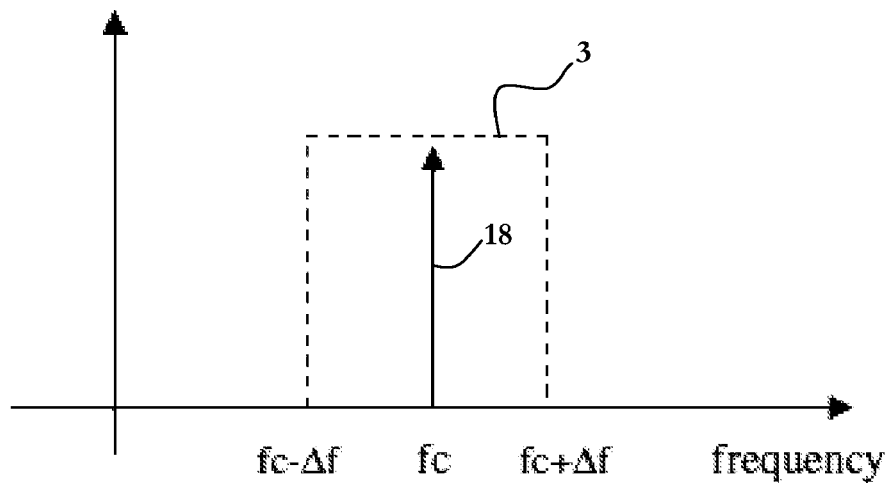
FIG. 8 is a graph of the communication bandwidth of a wireless communication device that can be charged by a power transfer device in accordance with an embodiment of the present invention.

In practice, the wireless communication devices 2, such as the mobile phone 14, have the communication bandwidth 3 for data transfer. For example, the communication bandwidth 3 can be defined as being from (fc−$\Delta$f) to (fc+$\Delta$f) for a carrier frequency of fc, as shown in FIG. 8. In other words, the magnitude of the communication bandwidth 3 is (2×$\Delta$f) in this example. The presence of the interference signals 5, in the form of sideband components, within the data transfer bandwidth (that is, the communication bandwidth 3) will adversely affect the quality of the received signal and hence affect the error bit rate of the mobile phone 14.

In order to avoid signal interference or degradation due to the sideband components 5, one embodiment of the present invention involves two approaches, as follows:

(1) If the charging frequency fs (that is, the transfer frequency 4) of the wireless charging pad 1 can be higher than or equal to $\Delta$f, then select fs$\geq$$\Delta$f. The sidebands 5 will not thereby occur within the data transfer bandwidth (that is, the communication bandwidth 3).

(2) If fs<Δf, then a spread-spectrum technique should be used in the switching frequency (or the transfer frequency 4) of the wireless charging pad 1 in order to reduce at least the magnitude of the sideband components 5 over the spectrum to a low or negligible level.

As described above, spread-spectrum switching techniques refer to methods that involve the varying of at least one of the variables of the switching functions, which include, but are not limited to, the switching frequency, the switching pulse width, and the positions of the switching pulses. The variation of the switching frequency of the wireless charging pad 1, or other power transfer device 1, can be one or more of dithering, pseudo-random, random, chaotic and modulated type.

A main aim of the spread-spectrum technique in the present embodiment is to ensure that the power of the sideband components 5 will not concentrate at certain frequencies and the magnitude of each sideband component is minimized. By varying the switching frequency of the wireless charging pad 1, the frequencies of the sideband components 5 vary with time. Consequently, the "average" power of the sideband components 5 is drastically reduced to an insignificant level.

In the present embodiment, any spread-spectrum technique can be adopted to transfer power at the transfer frequency 4 from the wireless charging pad 1 in order to reduce signal jamming in the mobile phone 14. However, preference is given to those spread-spectrum techniques that vary the charging frequency fs (that is, the transfer frequency 4) within a certain transfer bandwidth 6 that will not substantially affect the energy efficiency of the wireless power transfer from the wireless charging pad 1 to the mobile phone 14, or other wireless communication device 2. The reason is that the energy-receiving module of the mobile phone 14 typically consists of a tuned resonant tank that is designed to work at maximum efficiency at a constant switching frequency fs (that is, the transfer frequency 4) of the wireless charging pad 1. If fs is varied within a narrow transfer bandwidth 6 around the transfer frequency fs, then highly efficient wireless power transfer can be achieved.

Figure 9:
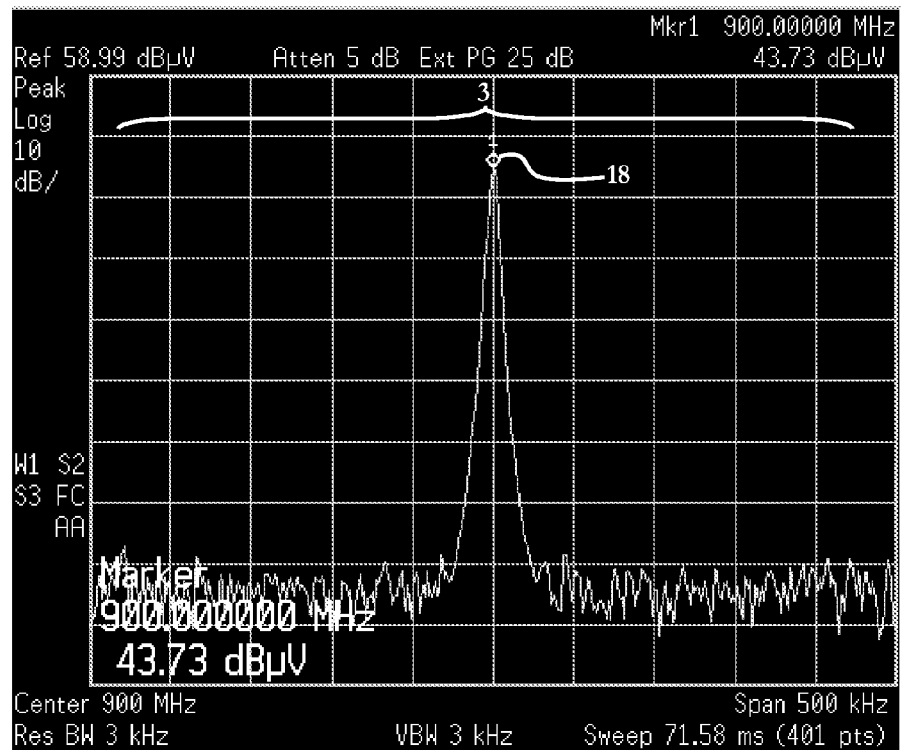
FIG. 9 is a graph of the signals received by the mobile phone in the experimental setup shown in FIG. 5 when a 900 MHz signal was transmitted to the mobile phone and the mobile phone was being charged by the wireless charging pad with AC flux at 110 kHz using a spread-spectrum technique in accordance with an embodiment of the present invention.

FIG. 7 shows the measured spectrum of the jammed signal in the antenna of the mobile phone 14 with the fs fixed at 110 kHz. The sideband components 5 are present. FIG. 9 shows the measured spectrum of the antenna signal with transfer frequency 4 (that is, fs) randomized between a transfer bandwidth 6 of 105 kHz and 115 kHz. As shown in FIG. 9, the sideband components 5 have become negligible.

Spread-spectrum techniques that involve a change of frequency are also called "frequency hopping spread-spectrum" (FHSS) methods. These FHSS methods are suitable for use in the present embodiment. Other suitable spread-spectrum techniques include utilizing a "direct sequence spread spectrum" (DSSS) method, as mentioned above, and a method where the transfer frequency 4 is chaotified.

Figure 10:
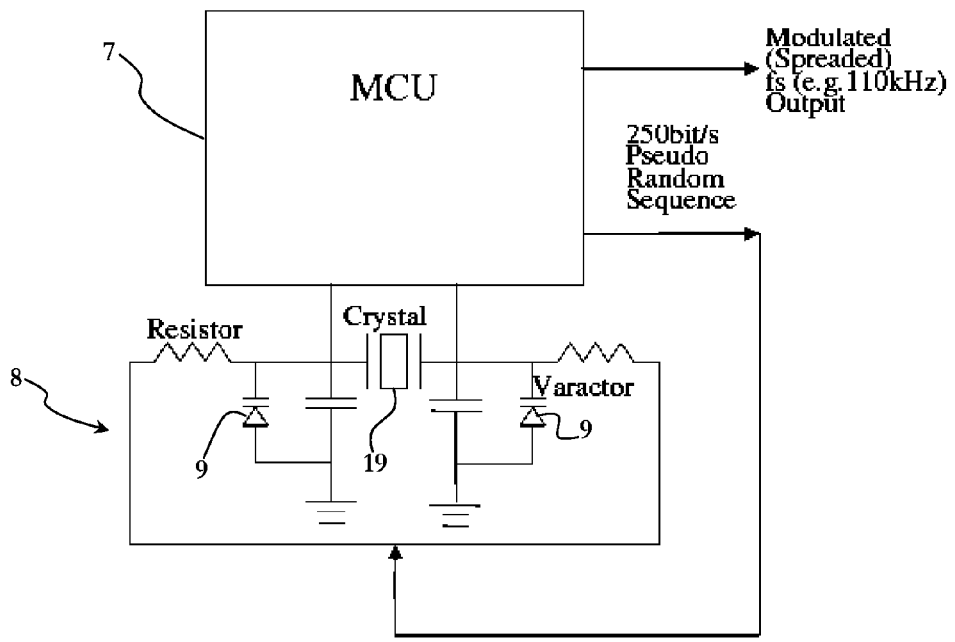
FIG. 10 is a circuit diagram of a circuit used to implement a direct sequence spread-spectrum method in accordance with an embodiment of the present invention.

One implementation example of a DSSS method is shown in FIG. 10, and was broadly described above. In the implementation shown in FIG. 10, the clock frequency of the microprocessor control unit 7 (MCU), which generates the switching control signals for a power inverter in the wireless charging system 1, is modified by a DSSS circuit. A pseudo-random sequence stored in the MCU 7 is sent out to modulate a clock crystal oscillator 19 in the MCU 7 through the two varactors 9. In this example, the clock crystal oscillator 19 provides the reference clock signal, thereby providing the clock frequency for the MCU 7. The advantage of this approach is that it is easy to control the bandwidth of the output signal fs (that is, the transfer frequency 4), which is 110 kHz in the presently described embodiment.

Figure 11:
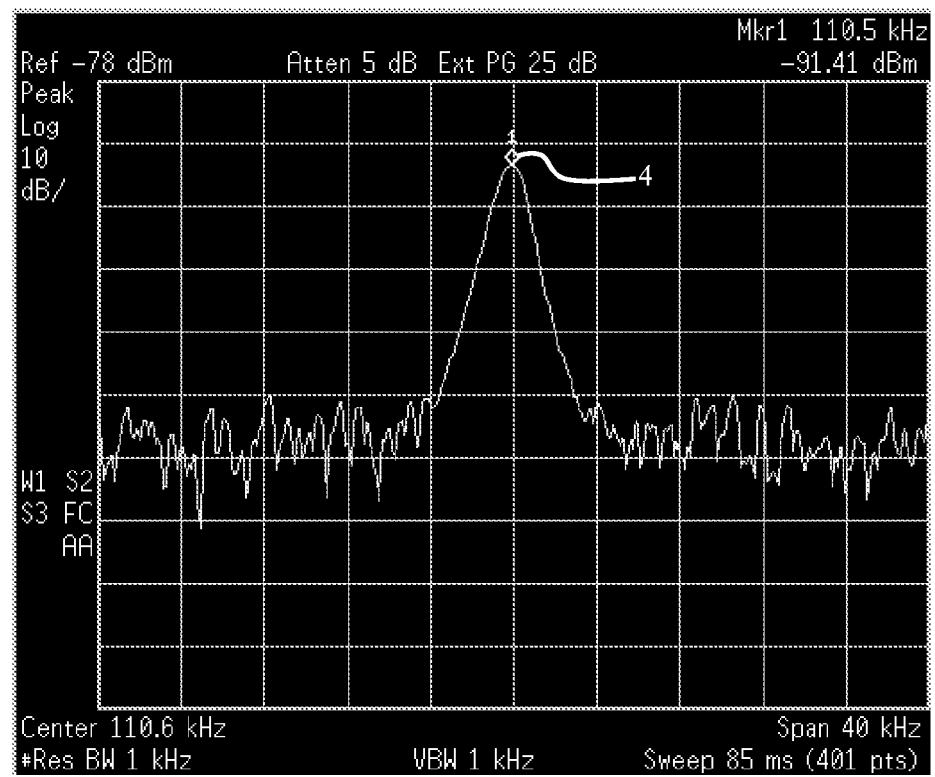
FIG. 11 is a graph of the signals generated by a wireless charging pad transferring power at 110 kHz.
Figure 12:
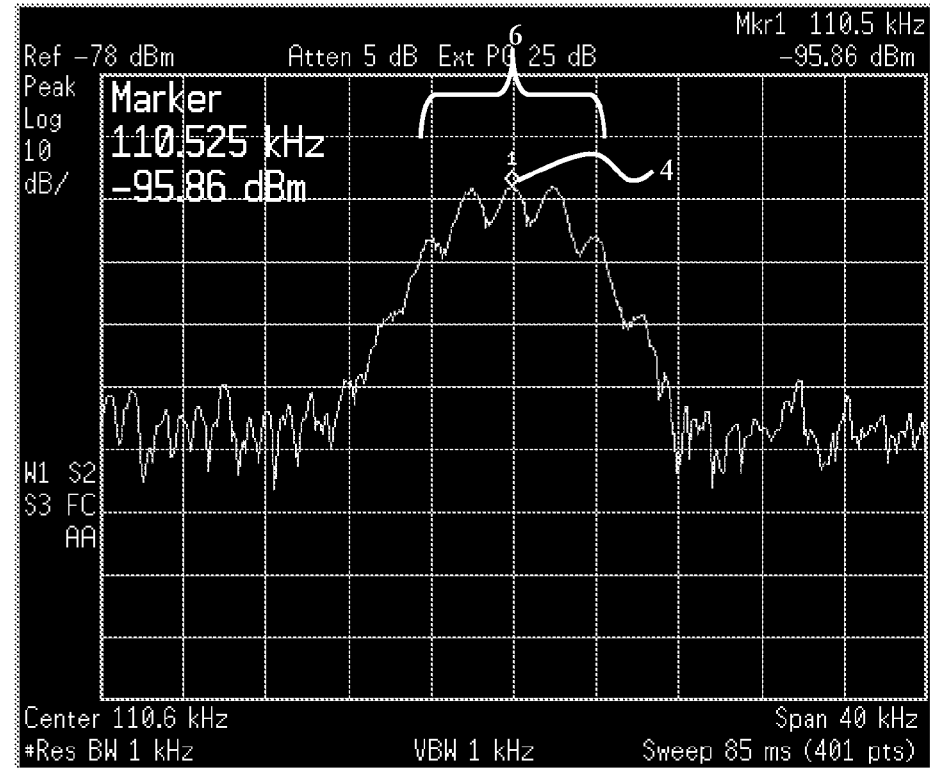
FIG. 12 is a graph of the signals generated by a wireless charging pad transferring power at 110 kHz using a randomized frequency modulation spread-spectrum method in accordance with an embodiment of the present invention.

Another spread-spectrum technique suitable for use in the present embodiment utilizes a randomized frequency modulation method. FIG. 11 shows the measured power spectrum of a typical switching signal at the transfer frequency 4 (which is at 110 kHz in this example) before the randomized frequency modulation method is applied. The 110 kHz switching signal can be seen clearly. FIG. 12 shows the measured power spectrum after the randomized frequency modulation method is applied. It can be observed that the switching signal power is spread over a range of frequencies with reduced magnitude. The effectiveness of the power spreading depends on the degree of randomization.

Another alternative is to chaotify the transfer frequency 4 (that is, fs) of the wireless charging pad 1. For example, chaotifying methods are described in 'Use of chaotic switching for harmonic power redistribution in power converters', Chaos in Circuits and Systems, World Scientific, 2002, Chapter 17, pp. 341-366, authored by Chung H., Hui S. Y. R. and Tse K. K. These methods are similar to random switching schemes, except the switching frequency is varied in a chaotic (and not a random) nature within a certain bandwidth.

Further aspects of the present invention provide methods of transferring power to a wireless communication device having a communication bandwidth. Broadly defined, one method includes using a spread-spectrum technique to transfer power at a transfer frequency to reduce or minimize interference signals within the communication bandwidth. Another method, also broadly defined, includes selecting to either: transfer power at a transfer frequency greater than or equal to the magnitude of the communication bandwidth; or use a spread-spectrum technique to transfer power at a transfer frequency less than the communication bandwidth to reduce or minimize interference signals within the communication bandwidth. It will be appreciated that the foregoing description illustrates preferred embodiments of these methods.

Although the invention has been described with reference to specific examples, it will be appreciated by those skilled in the art that the invention can be embodied in many other forms. It will also be appreciated by those skilled in the art that the features of the various examples described can be combined in other combinations.

What is claimed is:

1. A device comprising:
    a power transfer device for charging a wireless communication device having a communication bandwidth, the power transfer device transferring power at a transfer frequency using a spread-spectrum technique to reduce or minimize interference signals within the communication bandwidth, wherein the spread-spectrum technique utilizes a direct sequence spread-spectrum method implemented with a microprocessor control unit and a voltage controlled oscillator; wherein, the microprocessor control unit has a clock frequency and generates switching control signals for power inverter in the power transfer device, the direct sequence spread-spectrum method including storing a pseudo-random sequence in the microprocessor control unit and sending out the pseudorandom sequence to modulate the clock frequency through the voltage controlled oscillator.

2. A power transfer device according to claim 1 wherein the spread-spectrum technique reduces or minimizes the concentration of the interference signals.

3. A power transfer device according to claim 1 wherein the spread-spectrum technique reduces or minimizes the magnitude of at least one of the interference signals.

4. A power transfer device according to claim 1 wherein the spread-spectrum technique reduces or minimizes the average power of the interference signals.

5. A power transfer device according to claim 1 wherein power is transferred by switching and the spread-spectrum technique varies at least one of the characteristics of the switching.

6. A power transfer device according to claim 5 wherein the spread-spectrum technique varies at least one of switching frequency, switching pulse width, and switching pulse position.

7. A power transfer device according to claim 1 wherein the spread-spectrum technique is at least one of dithering, pseudo-random, random, chaotic, and modulated type, and thereby varies the transfer frequency.

8. A power transfer device according to claim 1 wherein the spread-spectrum technique varies the transfer frequency within a transfer bandwidth that maximizes the energy efficiency of the power transfer of the power transfer device.

9. A power transfer device according to claim 1 wherein the spread-spectrum technique utilizes at least one of variable pulse-position modulation, variable pulse-width modulation, variable carrier-frequency modulation with fixed duty cycle, and variable carrier-frequency modulation with variable duty cycle.

10. A power transfer device according to claim 1 wherein the spread-spectrum technique utilizes a frequency hopping spread-spectrum method.

11. A power transfer device according to claim 1 wherein the microprocessor control unit has an internal reference clock signal or an external reference clock signal.

12. A power transfer device according to claim 1 wherein the voltage controlled oscillator is implemented with two varactors.

13. A power transfer device according to claim 1 wherein the power transfer device wirelessly charges the wireless communication device.

14. A power transfer device according to claim 13 wherein the power transfer device wirelessly charges the wireless communication device using induction.

15. A power transfer device according to claim 1 wherein the communication bandwidth is located between 800 MHz and 1900 MHz.

16. A power transfer device according to claim 1 wherein the transfer frequency is less than the magnitude of the communication bandwidth.

17. A power transfer device according to claim 1 wherein the spread-spectrum technique reduces or minimizes interference within the power transfer device.

18. A device comprising:
a power transfer device for charging a wireless communication device having a communication bandwidth, the power transfer device transferring power at a transfer frequency, wherein either: the transfer frequency is selected to be greater than or equal to the magnitude of the communication bandwidth; or the transfer frequency is selected to be less than the magnitude of the communication bandwidth and the power transfer device transfers power using a spread-spectrum technique to reduce or minimize interference signals within the communication bandwidth, wherein the spread-spectrum technique utilizes a direct sequence spread-spectrum method implemented with a microprocessor control unit and a voltage controlled oscillator; wherein, the microprocessor control unit has a clock frequency and generates switching control signals for power inverter in the power transfer device, the direct sequence spread-spectrum method including storing a pseudo-random sequence in the microprocessor control unit and sending out the pseudo-random sequence to modulate the clock frequency through the voltage controlled oscillator.

19. A method comprising:
transferring power to a wireless communication device having a communication bandwidth, the method including using a spread-spectrum technique to transfer power at a transfer frequency to reduce or minimize interference signals within the communication bandwidth, wherein the spread-spectrum technique utilizes a direct sequence spread-spectrum method implemented with a microprocessor control unit and a voltage controlled oscillator; wherein, the microprocessor control unit has a clock frequency and generates switching control signals for power inverter in the power transfer device, the direct sequence spread-spectrum method including storing a pseudo-random sequence in the microprocessor control unit and sending out the pseudo-random sequence to modulate the clock frequency through the voltage controlled oscillator.

20. A method according to claim 19 wherein the spread-spectrum technique is used to reduce or minimize the concentration of the interference signals.

21. A method according to claim 19 wherein the spread-spectrum technique is used to reduce or minimize the magnitude of at least one of the interference signals.

22. A method according to claim 19 wherein the spread-spectrum technique is used to reduce or minimize the average power of the interference signals.

23. A method according to claim 19 including using switching to transfer power and the spread-spectrum technique is used to vary at least one of the characteristics of the switching.

24. A method according to claim 23 wherein the spread-spectrum technique is used to vary at least one of switching frequency, switching pulse width, and switching pulse position.

25. A method according to claim 19 wherein the spread-spectrum technique is at least one of dithering, pseudo-random, random, chaotic, and modulated type, and is thereby used to vary the transfer frequency.

26. A method according to claim 19 wherein the spread-spectrum technique is used to vary the transfer frequency within a transfer bandwidth that maximizes the energy efficiency of the power transfer.

27. A method according to claim 19 wherein the spread-spectrum technique utilizes at least one of variable pulse-position modulation, variable pulse-width modulation, variable carrier-frequency modulation with fixed duty cycle, and variable carrier-frequency modulation with variable duty cycle.

28. A method according to claim 19 wherein the spread-spectrum technique utilizes a frequency hopping spread-spectrum method.

29. A method according to claim 19 wherein the microprocessor control unit has an internal reference clock signal or an external reference clock signal.

30. A method according to claim 19 wherein the voltage controlled oscillator is implemented with two varactors.

31. A method according to claim 19 wherein power is transferred to wirelessly charge the wireless communication device.

32. A method according to claim 31 wherein power is transferred using induction to wirelessly charge the wireless communication device.

33. A method according to claim 19 wherein the communication bandwidth is located between 800 MHz and 1900 MHz.

34. A method according to claim 19 wherein the transfer frequency is less than the magnitude of the communication bandwidth.

35. A method according to claim 19 wherein a power transfer device is used to transfer power and the spread-spectrum technique is used to reduce or minimize interference within the power transfer device.

36. A method comprising:
   transferring power to a wireless communication device having a communication bandwidth, the method including selecting to either: transfer power at a transfer frequency greater than or equal to the magnitude of the communication bandwidth; or use a spread-spectrum technique to transfer power at a transfer frequency less than the communication bandwidth to reduce or minimize interference signals within the communication bandwidth, wherein the spread-spectrum technique utilizes a direct sequence spread-spectrum method implemented with a microprocessor control unit and a voltage controlled oscillator; wherein, the microprocessor control unit has a clock frequency and generates switching control signals for power inverter in the power transfer device, the direct sequence spread-spectrum method including storing a pseudo-random sequence in the microprocessor control unit and sending out the pseudo-random sequence to modulate the clock frequency through the voltage controlled oscillator.

* * * * *